United States Patent
Tejada

(10) Patent No.: US 11,040,736 B1
(45) Date of Patent: Jun. 22, 2021

(54) FOLDABLE SHOPPING CART

(71) Applicant: Emily Tejada, New York, NY (US)

(72) Inventor: Emily Tejada, New York, NY (US)

(*) Notice: Subject to any disclaimer, the term of this patent is extended or adjusted under 35 U.S.C. 154(b) by 0 days.

(21) Appl. No.: 16/740,846

(22) Filed: Jan. 13, 2020

(51) Int. Cl.
*B62B 3/02* (2006.01)
*B62B 5/04* (2006.01)
*B62B 3/00* (2006.01)

(52) U.S. Cl.
CPC .............. *B62B 3/027* (2013.01); *B62B 3/001* (2013.01); *B62B 5/0433* (2013.01); *B62B 5/0457* (2013.01); *B62B 2202/26* (2013.01); *B62B 2205/06* (2013.01); *B62B 2301/044* (2013.01)

(58) Field of Classification Search
CPC ....... B62B 3/027; B62B 3/001; B62B 5/0433; B62B 5/0457; B62B 2202/26; B62B 2205/06; B62B 2301/044
USPC ........................................................ 280/651
See application file for complete search history.

(56) References Cited

U.S. PATENT DOCUMENTS

| | | | | |
|---|---|---|---|---|
| 482,708 A * | 9/1892 | Watkins | ..................... | B62B 9/08 188/20 |
| 5,460,399 A * | 10/1995 | Baechler | ................. | B60B 37/10 188/20 |
| 6,341,672 B1 * | 1/2002 | Yang | ....................... | B62B 9/082 188/20 |
| 6,354,619 B1 | 3/2002 | Kim | | |
| 7,757,819 B2 * | 7/2010 | Chen | ....................... | B62B 9/087 188/20 |
| 8,205,723 B2 * | 6/2012 | Liao | ...................... | B62B 5/0438 188/19 |
| 9,409,665 B1 * | 8/2016 | Gregory | ............. | B65B 67/1205 |
| 9,561,151 B2 | 2/2017 | Opsetmoen | | |
| 9,738,298 B1 * | 8/2017 | Yang | ..................... | B62B 5/0003 |
| 9,950,729 B2 * | 4/2018 | Choi | ...................... | B62B 9/203 |
| 2020/0023875 A1 * | 1/2020 | Zhu | .......................... | B62B 3/02 |

FOREIGN PATENT DOCUMENTS

| | | | | | |
|---|---|---|---|---|---|
| GB | | 2290841 A | * | 1/1996 | ............. B62B 9/087 |
| JP | | 10157631 A | * | 6/1998 | |

* cited by examiner

*Primary Examiner* — John D Walters
(74) *Attorney, Agent, or Firm* — Sanchelima & Associates, P.A.; Christian Sanchelima; Alexander Rodriguez

(57) ABSTRACT

A foldable shopping cart is disclosed herein. The cart includes a folding frame that supports a fabric container in a basket-like configuration. Additionally, the cart frame includes four wheels of which, the two front wheels are swiveling castor-type wheels and the two rear wheels are fixed and include a braking system. The braking system consists of a friction rod that presses against the wheel via a spring which is connected to a trigger-like mechanism mounted to a foldable bar located between the rear wheels. The cart includes two posts that extend diagonally upward and proximally are vertically adjustable.

10 Claims, 5 Drawing Sheets

FOLDABLE SHOPPING CART

BACKGROUND OF THE INVENTION

1. Field of the Invention

The present invention relates to a foldable shopping cart and, more particularly, to a that foldable shopping cart that features a braking system to allow a user to maintain the cart in a stationary position.

2. Description of the Related Art

Several designs for shopping carts have been designed in the past. None of them, however, include a cart comprising a folding frame that supports a fabric container in a basket-like configuration. Additionally, the cart frame includes four wheels of which, the two front wheels are swiveling castor-type wheels and the two rear wheels are fixed and include a braking system. The braking system consists of a friction rod that presses against the wheel via a spring which is connected to a trigger-like mechanism mounted to a foldable bar located between the rear wheels. The cart includes two posts that extend diagonally upward and proximally are vertically adjustable. It is known that individuals often have carry their own shopping cart when obtaining items at sales location such as supermarkets or department stores. Additionally, it is also known that individuals will often leave their cart stationary when looking for various items. The cart may then roll away from the user if left poorly attended to. Therefore, there is a need for a shopping cart featuring a braking system that will allow a user to lock the cart in a stationary position. Additionally, the cart features telescopic handles that are adjustable to a user's height so that they may comfortably travel with the cart.

Applicant believes that a related reference corresponds to U.S. Pat. No. 9,561,151 issued for a collapsible support and shopping walker with an integrated braking system. Applicant believes that another related reference corresponds to U.S. Pat. No. 6,354,619 issued for a portable and collapsible shopping cart. However, these references differ from the present invention because they fail to address the combination of the structural components of the present invention. The present invention addresses the issue of having an adjustable cart that can be adjusted to suit a user's height. The present invention features two independently telescopic handlebars that may be adjusted by the user. Additionally, the present invention addresses the issue of including a parking brake across the rear wheels of the cart to allow the user to lock the cart in a stationary position. This configuration allows a user to safely leave the cart without fear of their items being taken away or the cart being misplaced.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a cart that features a foldable configuration to allow a user to easily store and transport the cart for later use.

It is another object of this invention to provide a cart featuring independent telescopic handles to allow the user to adjust the handle to comfortably suit their height.

It is still another object of the present invention to provide a cart featuring a braking system located across the rear wheels of the cart to allow a user to easily lock the cart in a stationary position using their foot.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
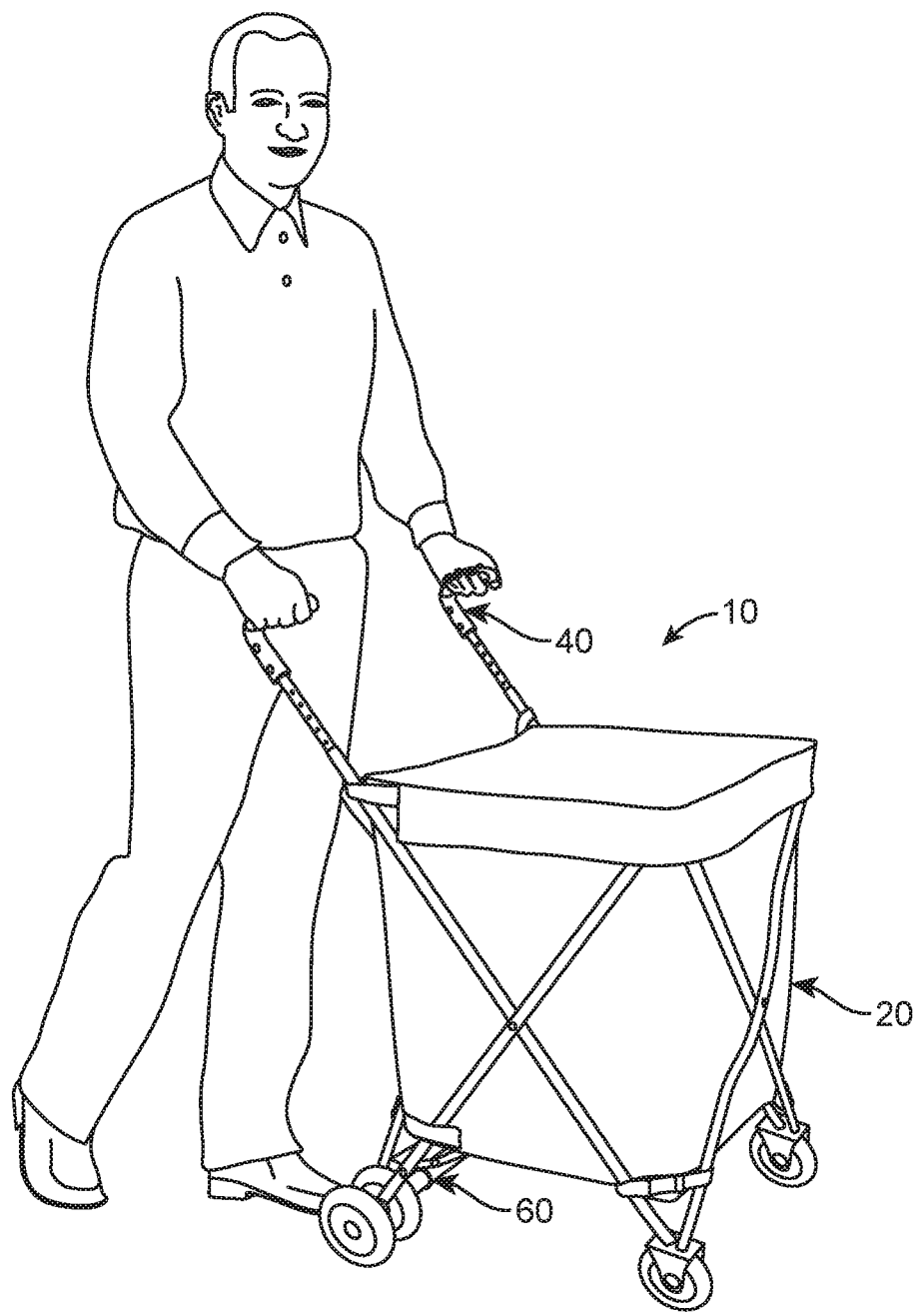
FIG. 1 represents an isometric view of cart 10 in its operational environment in accordance to an embodiment of the present invention.
Figure 2:
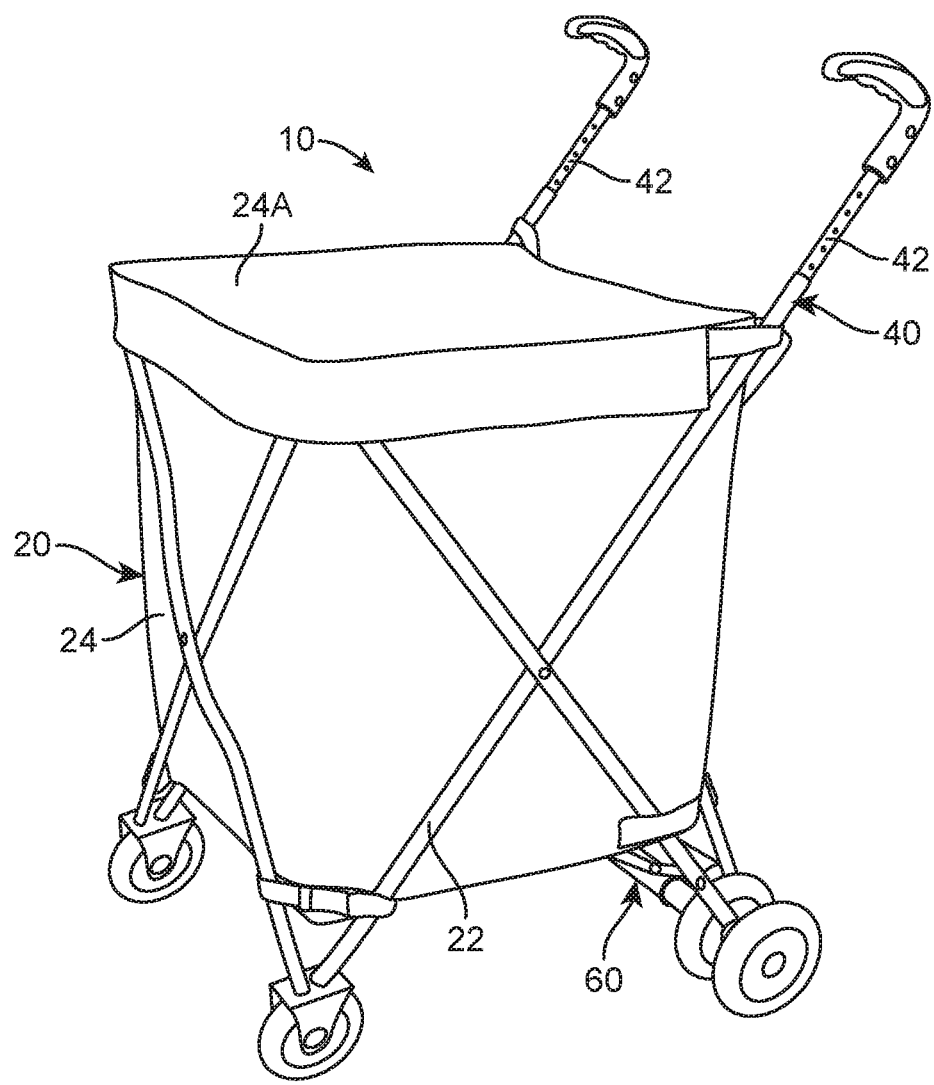
FIG. 2 shows an isometric view of cart 10 having frame assembly 20, a handle assembly 40, and a brake assembly 60.
Figure 3:
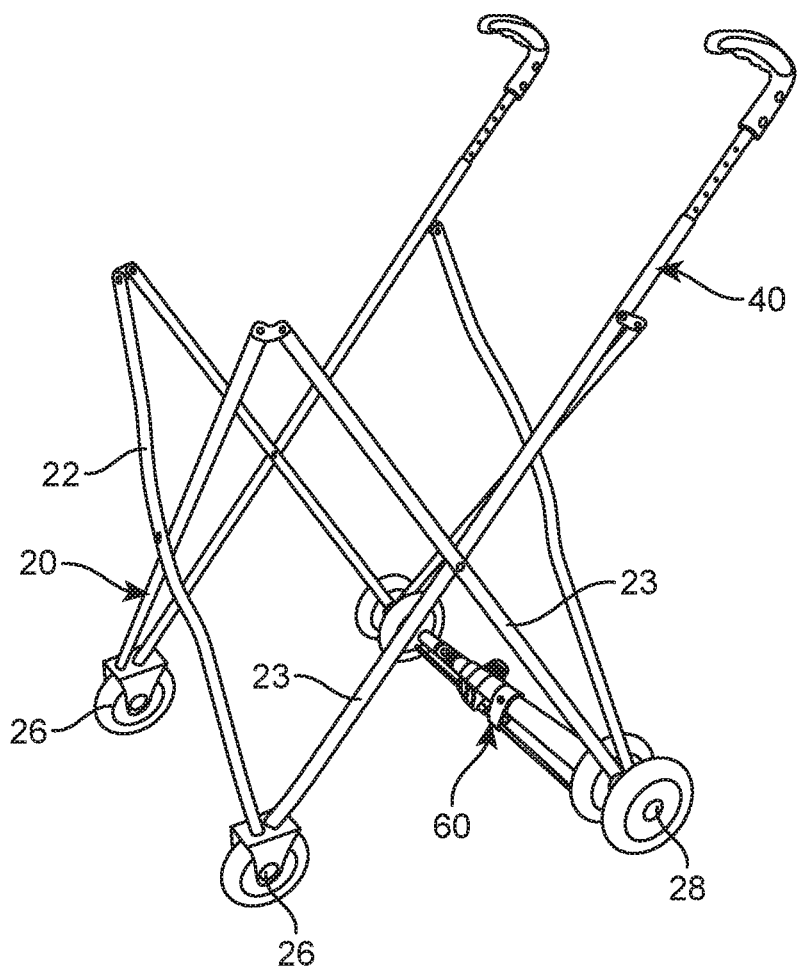
FIG. 3 illustrates an isometric view of frame assembly 20 in accordance to an embodiment of the present invention.
Figure 4:
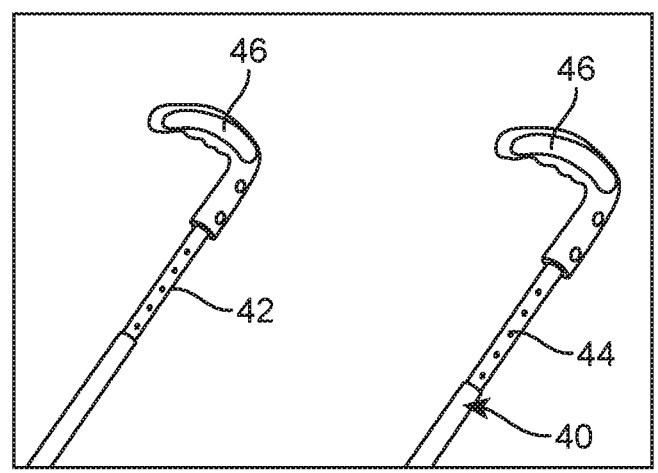
FIG. 4 is a representation of an enlarged view of handle assembly 40 in accordance to an embodiment of the present invention.
Figure 5:
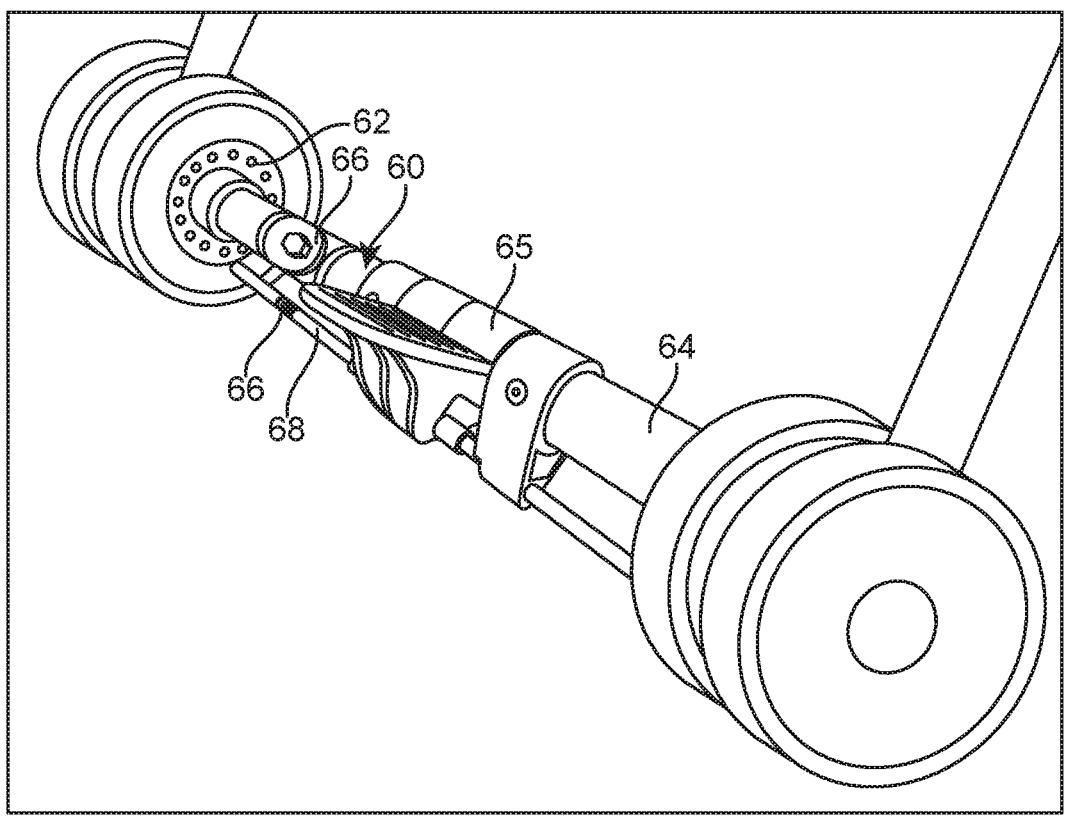
FIG. 5 shows an enlarged view of brake assembly 60 in accordance to an embodiment of the present invention.
Figure 6:
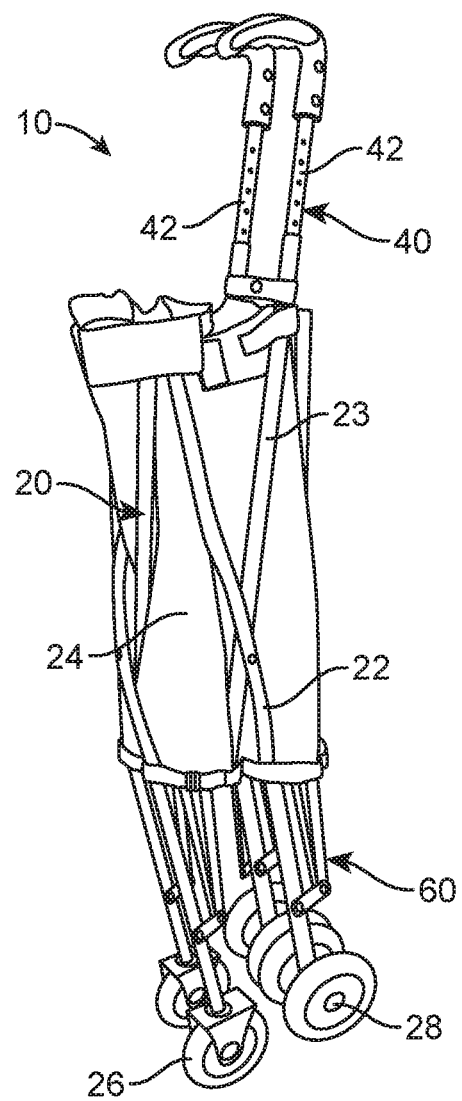
FIG. 6 illustrates an isometric view of cart 10 in a folded configuration in accordance to an embodiment of the present invention.

Referring now to the drawings, where the present invention is generally referred to with numeral 10, it can be observed a foldable cart 10 that includes a frame assembly 20, a handle assembly 40, and a brake assembly 60.

Frame assembly 20 includes a frame 22 having frame members 23 that define sidewalls and a rectangular perimeter of frame 22. In one embodiment, frame members 23 are cross shaped or X-shaped frame members mounted along sidewalls of frame 22. Additionally, the cross shaped frame members 23 may each joined together by a pivot point that allow the frame members to extended as needed by a user. Frame members 23 may be made of any suitable sturdy material such as metal, plastic and the like. Frame members 23 may include other variations of foldable and collapsible frame members for frame 22. Furthermore, frame 22 includes a fabric container 24 being held therein. In one embodiment, fabric container 24 is mounted in a basket-like configuration within frame 22. Fabric container 24 takes the shape of the volume of frame 22 and allows a user to place several items therein. This may be a cubic rectangular volume as depicted in the provided drawings These items may refer to items acquired by a user when shopping for groceries or department stores. Additionally, fabric container 24 may be a removable component of frame 22 or it may be provided as an integral component to frame 22. In one embodiment, fabric container 24 further includes a fabric lid 24A being attached to a top edge. The upper perimeter of the fabric container 24 may be mounted to the corners of frame 22 for support. Fabric lid 24A may be a square like lid that covers an entire top end of fabric container 24. Similarly, fabric lid 24A may be provided as an integral or removable attachment to fabric container 24.

Frame assembly 20 further includes frame 22 having front wheels 26 and rear wheels 28. In the present embodiment, front wheels 26 represent the wheels at the front end of frame 22. As depicted in the drawings, front wheels 26 may be provided as castor type wheels. The castor type wheels allow a user to easily maneuver the direction of frame assembly 20 as it is being used by a user. Additionally, the castor type wheels allow a user to more effortlessly turn the shopping cart around corners. Furthermore, rear wheels 28 may be provided as stationary wheels being fixes to frame 22 having a treaded outer frame. This configuration of rear wheels 28 allows a user to maneuver the cart through otherwise difficult terrain. In one embodiment, rear wheels 28 may have a larger size than front wheels 26. Frame 22 is configured to be folded into a compressed configuration when not in use. This is done possible through the structure of the frame member 23. When a user desires to fold the cart for storage or transportation, frame members 23 are then vertically collapsed to form the compressed configuration. The compressed configuration may be provided with or without the fabric container being held therein. Additionally, the compressed configuration provides ease of storage and transportation for foldable cart 10.

Handle assembly 40 includes posts 42 extending from frame members 23 of frame 22. As depicted in the drawings, posts 42 may be extending towards a rear end of frame 22 and extend upwardly beyond a top end of the frame. In one embodiment, posts 42 are telescopic posts having a cylindrical shape. Posts 42 can then be vertically adjusted to suit a user's height. This proves beneficial with user's in wheelchairs or tall individuals that need an extended post to comfortable maneuver foldable cart 10. Furthermore, posts 42 may further include a locking mechanism 44 to further benefit the telescopic nature of posts 42. Locking mechanism 44 may be any suitable locking means known in the art to secure posts 42 in a raised position once their height has been adjusted. In one embodiment, locking mechanism 44 may be a push button locking mechanism that allows a user to adjust the height of posts 42 once the push button lock is engaged. Additionally, posts 42 may further include handles 46 mounted to a topmost end. In one embodiment, handles 46 are mounted in a perpendicular configuration to posts 42. Handles 46 may additionally include rubber grips thereon to provide a comfortable grasping means to a user operating foldable cart 10.

Brake assembly 60 includes a screw plate 62 that is mounted to an inner portion of each of rear wheels 28. In one embodiment, screw plate 62 may be a flat metal plate having circular configuration of holes located along the plate. Other variations of screw plates may be used for screw plate 62. Brake assembly 60 also includes an attachment rod 64 extending across rear wheels 28. Attachment rod 64 may be an elongated cylindrical rod that creates a connection between the inner portion of rear wheels 28. Additionally, attachment rod 64 includes a foot switch 65 attached thereon. Foot switch 65 may also include a protruding tongue portion that is adapted to be received by a user's foot to then engage brake assembly 60. In one embodiment, attachment rod 64 is provided in a foldable configuration. A ladder hinge 66 is then provided as an integral part of attachment rod 64 to allow the attachment rod 64 to be folded. Furthermore, brake assembly 60 includes a locking rod 68 extending through foot switch 65. Locking rod 68 may be an elongated cylindrical rod that includes a diameter being less than the diameter of attachment rod 42. In the event that a user desires to engage the brake assembly, a user then steps on foot switch 65 to actuate locking rod 68. Locking rod 68 is then urged through an opening of screw plate 62 to then effectively engage rear wheels 28 in a locked position. When the user desires to disengage the brake, the foot switch is then once again actuated and the locking rod 68 is removed from the screw plate 62. Locking rod 68 further includes a ladder hinge 66 similar to its placement on attachment rod 64 to allow it to be folded as well. Brake assembly 60 provides the much-desired benefit of being able to engage foldable cart 10 in a parked configuration. This parked configuration will prevent the cart from accidently moving away when a user is utilizing foldable cart 10 in a shopping environment.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A system for a foldable cart, comprising:
   a. a frame assembly including a frame having cross shaped frame members defining sidewalls of said frame, said frame including a pair of front wheels and a pair rear wheels, said frame including a fabric container configured to hold items therein;
   b. a handle assembly including two posts extending from said cross shaped frame, wherein said two posts are telescopic posts adapted to be adjustable by a user; and
   c. a brake assembly including an elongated rod extending across said pair of rear wheels, said elongated rod having a foot switch that receives a locking rod, said elongated rod and said locking rod each having a ladder hinge to allow each rod to be foldable, said locking rod extends into a screw plate when said foot switch is engaged.

2. The foldable shopping cart of claim 1 wherein said fabric container is removable from said frame.

3. The foldable shopping cart of claim 1 wherein said fabric container includes a fabric lid.

4. The foldable shopping cart of claim 1 wherein said pair of front wheels are swiveling castor type wheels.

5. The foldable shopping cart of claim 1 wherein said pair of rear wheels are stationary wheels.

6. The foldable shopping cart of claim 1 wherein said two posts extend toward a rear end of said frame in a diagonal direction.

7. The foldable shopping cart of claim 1 wherein said two posts each include a handle at a topmost end.

8. The foldable shopping cart of claim 1 wherein said handle is mounted perpendicular to said two posts.

9. The foldable shopping cart of claim 1 wherein said cross members are vertically foldable to form a folded configuration.

10. A system for a foldable cart, comprising:
    a. a frame assembly including a frame having X-shaped frame members defining a rectangular perimeter of said frame, said frame of said frame holding a fabric container, wherein said fabric container is held in a basket-like configuration, said frame further including a pair of front wheels and a pair of rear wheels, wherein said pair of front wheels are a pair of swiveling castor type wheels, wherein said pair of rear wheels are fixed wheels with a treaded outer frame, wherein said frame folds into a compressed configuration when not in use;

b. a handle assembly including two independent posts extending diagonally upward, said two independent posts extend from said X-shaped frame members, said two independent posts each including a locking mechanism allowing said two independent posts to be vertically adjustable, wherein said locking mechanism is a push button locking mechanism, said two independent posts further including perpendicular handles attached to a top most end; and c. a brake assembly including a circular metal screw plate attached to an inner portion of said pair of rear wheels, an attachment rod extending across said pair of rear wheels, said attachment rod having a foot switch located thereon, said foot switch having a protruding tongue portion, said attachment rod having a first integral ladder hinge to allow said attachment rod to be foldable, a locking rod attached through said foot switch, said locking rod including a second ladder hinge to allow said ladder hinge to be foldable, said locking rod extending through an opening of said circular metal screw plate when said foot switch is engaged to provide said foldable cart in a braking state, said attachment rod includes a diameter larger than said locking rod.

* * * * *